United States Patent [19]

Ginatta

[11] 3,985,630

[45] Oct. 12, 1976

[54] METHOD OF EXTRACTING METALS FROM SPENT ELECTRIC STORAGE BATTERIES

[76] Inventor: Marco Ginatta, Corso Alberto Picco, 35, Turin, Italy

[22] Filed: July 21, 1975

[21] Appl. No.: 584,833

[30] Foreign Application Priority Data
July 25, 1974 Italy .................................. 69363/74
Dec. 30, 1974 Italy .................................. 70770/74

[52] U.S. Cl. ................................. 204/96; 204/114; 204/119; 204/146
[51] Int. Cl.² ...................... C25B 1/00; C25F 5/00; C25C 1/18
[58] Field of Search ............. 204/114, 96, 146, 119, 204/115

[56] References Cited
UNITED STATES PATENTS
1,911,604  5/1933  Calbeck ............................ 204/114
2,393,239  1/1946  Deitz ................................. 204/114

Primary Examiner—R. L. Andrews
Attorney, Agent, or Firm—Edwin E. Greigg

[57] ABSTRACT

Metals are recovered from the electrodes and connections of spent electric storage batteries by the step of: (a) recharging the spent electric batteries; (b) removing the electrolyte from said recharged electric batteries; (c) removing the bottom of said recharged batteries from which the electrolyte has been removed; (d) washing the electrodes and inside and outside the bottomless batteries obtained in step (c) with water; (e) drying the batteries washed in step (d) and closing the openings in the top of the dry batteries; (f) connecting the positive terminal of a power supply to the negative pole of the batteries obtained according to step (e) with protection against contact between electrolyte and the negative pole; and (g) immersing the batteries obtained according to step (f) in an electrolyte.

16 Claims, No Drawings

METHOD OF EXTRACTING METALS FROM SPENT ELECTRIC STORAGE BATTERIES

BACKGROUND OF THE INVENTION

My invention relates to a method for extracting metals from scrap batteries. An object of my invention is to bring about dissolution of the electrodes of electric storage batteries by electrolysis in an electrolytic solution. A further object is dissolution of the electrodes of electric storage batteries by means of electrolysis in an electrolytic solution with deposition of the metals on cathodes external to the batteries. Another object is to produce the electrochemical forces dissolution of the electrodes above mentioned while immersed in an electrolyte by means of a power supply, with the deposition of the metals on cathodes external to the batteries. Also another object is to produce, by dissolution of spent electric storage batteries, oxides and suboxides on anodes immersed in the same electrolyte.

In accordance with my invention, a complete electrochemical system, the spent battery, is used as part of another larger electrochemical system. In my process four different electrode reactions are taking place at the same time, their rate also being in steady-state equilibrium with one chemical reaction occurring in the electrolyte. The process of my invention is suited for extraction of metals from all primary and secondary electric storage batteries.

For the purpose of illustrating my process, I will use as a practical example the lead-acid electric storage battery. The end of the useful life of these batteries is determined by the accumulation on the electrode surfaces of lead sulfate crystallized in the form known as hard sulfate. These crystals, unlike the finely dispersed sulfate which constitutes the product of normal battery discharge, resist anodic reoxidation to dioxide during recharging. Since lead sulfate is an electrical insulator, battery capacity is reduced proportionally to the area of the electrodes covered with crystals. Since the quantity of lead contained in batteries that is actually used electrochemically is in the range of 25 – 50%, most spent storage batteries classified as scrap consist of lead sulfate, lead dioxide, up to 12% of antimony, tin or calcium alloys and metallic lead.

In accordance with this invention, it has been found that antimony, tin, calcium and titanium are left behind in the treated battery containers in the form of anodic mud or slimes, especially when an external power source is used and when external electrodes are used for collection of lead and lead suboxide. It has further been found that recovery of anodic slimes containing grid metals and grid alloying metals is particularly effective if the electrolyte used during the dissolution process is based on sulfamic acid and if the recovery of lead is carried out at a temperature near room temperature.

Traditionally, recovery of lead from spent batteries requires physical demolition of the batteries by crushing, shredding, and classifying steps in whcih significant amounts of lead are lost. Besides, these operations create large volumes of battery-container fragments which are difficult to dispose of. The scrap thus segregated has heretofore been refined using pyrometallurgical processes, which generate large quantities of fumes from the combustion of fragments of the battery containers and separators still attached to the lead scrap. The worst aspect, however, is the sulfur dioxide emission from lead sulfate decomposition.

Presently, air quality specifications, fuel costs, and the costs of battery crushing and scrap classification, do not permit economically feasible extraction of lead values by pyrometallurgical methods.

In addition, improved storage battery construction will tend to worsen the problems of recovering lead from spent batteries, which will have thinner and more numerous electrodes for increasing battery efficiency; require complex container shapes which are more difficult to demolish; have grids made of metals such as titanium to decrease battery weight; and which further require a separate process for recovering these valuable metals.

An object of my invention is to produce pure lead from spent electric storage batteries. Another object is to extract lead contained in spent electric storage batteries with a minimum of container demolition. Another object is to extract lead in spent storage batteries without emission of gaseous $SO_2$. Another object of my invention is the separation of lead from grids containing other alloying metals.

It has been found, according to my invention, that metals can be extracted from spent lead batteries without destruction of the battery case so as to permit reuse of the container and thereby produce significant cost savings and eliminate problems associated with disposing of the cases.

The relative cheapness of the products obtained from the treatment of scrap batteries — lead being presently the lowest priced base metal — needs to be considered along with the need to avoid the production of air and water pollutants.

Since lead-acid electric storage batteries are very efficient electrochemical systems, I came to an appreciation that the most appropriate methods for the recovery of lead are those which make use of the electrochemical characteristics of the batteries themselves, specifically:

the electrochemical equivalent of lead is among the highest of the metals;

batteries are permeable to electrolyte circulation;

containers are corrosion resistant and not poisoning;

the electrical connections are there already; etc.

An optimum process requires an electrolyte which is of a simple electrolytic composition, which is cheap to prepare and maintain and is non-toxic and simple to dispose of.

Moreover, flat cathodes, or a very fine dendritic deposit, must be converted into active material.

Electrolyte circulation inside and outside the spent battery cells is a critical requirement of my process; this circulation can be performed in various ways including: two-way circulation through the existing battery openings, and free or forced circulation through the battery from which the bottom and/or the walls of the container have been removed.

A further object of my invention is the use of the electrochemical characteristics of the batteries in order to effect dissolution of the electrodes.

In the conventional battery construction each group of positive electrodes of a cell are electrically (electronic conductivity) connected to the group of negative electrodes of the next cell. Normally, to obtain cumulative voltages, the cells have separated electrolyte compartments so that there is no electrical connection through the electrolyte (ionic conductivity) between the two groups of electrodes. However, in an electrochemical battery there is no electronic conductivity between the positive electrodes and the negative electrodes of the same cell.

Therefore, when the same body of electrolyte is simultaneously in contact with all the electrodes of the battery, that is, when there is no separation between adjacent cells, the battery becomes an electrochemical system composed of a series of electronically-connected positive and negative couples of electrodes all immersed in the same electrolyte.

For lead-acid electric storage batteries, this condition results in a natural tendency for the negative electrodes (Pb) to anodically dissolve (oxidize) to release lead ions into the solution and electrons which go to the positive electrodes ($PbO_2$) to participate in the reduction of $Pb^{++++}$ into $Pb^{++}$; the latter reacts with the electrolyte and goes in solution.

Another object of my invention is to accelerate the rate of dissolution. To this end, the anodic electrical connection of the power source can be attached to both positive and negative poles as well as to all electrical connections between cells of the battery. However, I have found that it is sufficient to connect the anode (positive) electrical connection of the power source only to the negative pole of the battery. Since a group of negative electrodes is attached at the negative pole, all the remaining couples of electrode groups react in series, down to the last positive group of electrodes which is connected to the positive battery pole, which is made of metallic lead and which constitutes the last couple with this last group of positive electrodes.

From the battery dissolution mechanism described above, it is clear that a larger quantity of lead goes in solution than the amount of lead which can be extracted by cathodic deposition. Gradual accumulation of lead in the electrolyte up to saturation and precipitation will thus occur unless auxiliary anodes are introduced into the system. These auxiliary anodes can be made of any electronically conducting material which is insoluble in the electrolyte; they will support anodic reactions which provide additional electrons to the cathodes, thus permitting the extraction from the electrolyte of lead in excess of optimum concentration.

Depending on the electrolyte composition and additives, lead is obtained on the cathodes in different morphologies, such as flat plates or a very fine dendritic deposition readily converted into lead powder used to fabricate electrodes for electric storage batteries. As to the direct production on the anodes of lead suboxide ($Pb_2O$) for use in fabricating battery electrodes, it is of interest that the present practice of obtaining the active paste by oxidizing pure lead from ingots can be by-passed in accordance with this invention. This aspect of the process is significant because 60% of all lead scrap originates from batteries and 70% of all secondary lead is used in electric storage battery manufacturing.

A practical embodiment of my invention, resulting in the direct production of flat 99.99% lead cathodes and pure lead suboxide and fulfilling all the requirements listed above is as follows:

The electrolyte is a sulfamate based aqueous solution containing 70–250 grams per liter of total sulfamic acid ($NH_2SO_3H$), 50–100 grams per liter of free acid, 40–240 grams per liter of lead ion, and optional additives for promoting plate-like deposits, such as 1. –2. gram per liter of tannic acid. Temperatures between 15° and 40° C are satisfactory. The acidity of the electrolyte varies between pH 0.7 and pH 2.5 and the density varies between 1.10 and 1.40 grams per milliliter; both are functions of lead concentration.

Another practical embodiment of my invention resulting in the direct production of a very fine dendritic deposit of pure lead and fulfilling the requirements mentioned above is as follows:

The electrolyte is an aqueous solution of acetates and sulfates containing about 200 grams per liter of sodium acetate and/or lead acetate, which also contains lead sulfate from the sulfate in the batteries. The acetate concentration can vary over wide limits. Temperature around 30° C are preferred. The acidity of the electrolyte can vary below pH 7.

The batteries from which lead is recovered are prepared as follows:

1. The batteries are recharged. This operation is important in reducing the $PbSO_4$ content of the batteries and is an economically sound practice, because more than 70% of the batteries are scrapped, owing to the failure of one cell only.

2. Sulfuric acid solutions (about 30°Be), which is used in other hydrometallurgical operations, is removed from the charged batteries.

3. The bottom of the battery containers are removed, using any suitable stripping, cutting, sawing, melting device.

4. The electrodes and the inside and outside of the battery containers are thoroughly washed in water. This operation removes entrapped sulfuric acid which would otherwise displace lead from the solution and precipitate as $PbSO_4$.

5. The batteries are dried and the stoppers checked that they are securely positioned to close the top apertures in the batteries. Open top apertures are closed by resetting their stoppers or by other means.

6. The positive terminal of the power supply is connected to the negative pole of the batteries with protection against contact between the electrolyte and the negative pole itself.

7. The batteries are immersed in the electrolyte by means of any device suitable for both moving and/or supporting them and for being at the same time the current lead or having separate electrical connections.

It will be understood that, in addition to the foregoing, it is frequently desirable to circulate electrolyte inside and outside of the battery containers, and that this procedure is, in fact, preferred.

It will further be understood that another embodiment of this invention is that in which, in order to force dissolution of lead contained in spent batteries, the operation is assisted by deposition of the metals on cathodes external to the spent batteries. That is, in such an embodiment, an external power supply is used to cause deposition of metals on cathodes external to said batteries.

The position of the batteries within the electrolyte is a very important feature of my invention. I obtained very good results when batteries were totally immersed under the surface level of the electrolyte and positioned upside-down with respect to the normal operating position during the life of the batteries. The depth of immersion can vary. The cathodes are sheets made of any electronic conductor immersed in the electrolyte in the proximity of the batteries; they can have any shape depending upon the way the batteries are positioned. Lead starting sheets are satisfactory. The cathodes can be immersed before or after the batteries have been also immersed, at a distance varying between 5 and 20 cm.

Since the reactions taking place at the batteries release to the solution more lead than the cathodes can extract, auxiliary anodes are immersed in the electrolyte to remove lead from the solution in the form of lead oxide; their surface area is adjusted according to the amount of lead to be extracted if their electrical connections are in parallel with the batteries. I have found control of the electrolyte lead content is easier if auxiliary anodes are connected to a separate power supply with the negative terminal in common with the cathodes. This mode of operation also permits the treatment of damaged batteries; that is, batteries which have interrupted or faulty electrical connections at the poles and/or between cells and between electrodes. Since the forced dissolution described earlier does not work with these batteries, dissolution occurs only according to the mechanism described above.

A pretreatment which is particularly beneficial toward facilitating the processing of heavily sulfated batteries, is as follows:

The batteries are left immersed in the electrolyte with no electronic connections with the rest of the system, that is, without externally supplied current, for about 24 hours, until the potential difference of the battery with respect to the working lead cathode reaches a stable value of about +0.5 V. This pretreatment permits the operation of the metal extraction process at lower voltages and/or at higher current densities, and it is therefore desirable for all batteries.

Also, these immersed batteries can be completely discharged by electrically connecting the poles of each battery, in short circuit or through a resistor in order to avoid too rapid a discharge.

The electrowinning of lead proceeds according to the following steps:

Initially, no externally applied voltage is required to extract lead from the batteries and deposit it on the cathodes; sometimes the current must be limited to an optimum value around 100 amps per square meter. During this stage the temperature of the electrolyte near batteries tends to increase. As time proceeds, voltage is required to maintain the current at the optimum value. Toward the end of the process, the voltage must be limited to a maximum value between 4 and 6 volts, in order to avoid hydrogen codeposition on the cathodes. This also allows the current to decrease. During this final stage the electrolyte temperature also tends to fall.

In order to recover 90% of the initial lead content, the process is allowed to continue between four and ten days, depending upon the characteristics and the geometry of the batteries.

To avoid large temperature variations the electrolytic tanks can be arranged in cascade for the circulation of the electrolyte, thereby permitting the electrolyte to flow through tanks which have batteries at different steps of the process. At the end of the process, the residue from the batteries is removed from the tanks and washed countercurrently to recover entrapped electrolyte. When the process conditions are optimally set, separators and anode mud remain in the battery containers and the only metallic lead left is the negative pole.

Depending upon the relative sizes of the cathodes with respect to the batteries, the cathodes can be harvested after one or after two battery dissolution cycles.

Washing the interior of the battery containers liberates the anode mud, which contains alloying metals treated according to their nature, from the separators.

The battery containers can be reused in manufacturing new electric storage batteries.

It will be understood, in addition to the foregoing, that in order to shorten the total time required by the process for the extraction of over 90% of the metals initially contained in the batteries it is frequently desirable to proceed as follows:

The positive terminal of the separate power supply for the anodes, as described above, remains connected to the anodes, while the negative terminal of this power supply is connected to the positive pole of the batteries. Therefore, both poles of the immersed batteries are protected against the contact with the electrolyte; they are electronically connected, the positive poles to the negative terminal of the separate power supply for the anodes, and the negative poles to the positive terminal of the power supply for the cathodes, respectively.

This mode of operation, when the electrochemical reaction rates are correctly balanced, permits the use of higher current densities, therefore achieving the extraction of the metals contained in the batteries in a shorter time.

Further, in addition to the foregoing, it will be understood that the forced dissolution of the electrodes of the batteries into the electrolyte can be performed independently of the electrowinning of the metals and oxides from the electrolyte. To this purpose, the negative poles of the batteries are connected to the positive terminal of a power supply, while the positive poles of the batteries are connected to the negative terminal of the same power supply. The cathodes and the anodes are connected to the negative and to the positive terminal respectively, of a separate power supply.

Therefore, the dissolution of the batteries electrodes can be performed in tanks which are separated from those in which the electrowinning of the metals and of the oxides is effected, provided that the electrolyte is circulated among all tanks in order to keep constant the lead ion concentration.

Furthermore, the dissolution of the batteries electrodes and the electrowinning of the metals and oxides from the electrolyte can be performed in alternate times in the same tanks, therefore allowing the lead ion concentration to raise during the dissolution and to fall during the electrowinning.

The essential characteristic of my invention is that a complete electrochemical system, the spent battery, is used as part of another larger electrochemical system.

The battery electrodes dissolution mechanism described above involves the following reactions:

1. Oxidation of lead of the negative electrodes and dissolution of lead ions into the electrolyte.
2. Reduction of lead dioxide of the positive electrodes to lead monoxide.
3. Reaction of lead monoxide with acid in the electrolyte to form lead complex.
4. Reduction of lead ions at the cathodes external to the battery.
5. Production of lead suboxide on the auxiliary anodes.

The collection of the $Pb_2O$ is another important function of the auxiliary anodes; without them lead suboxide tends to deposit on the battery electrodes to produce physical clogging which hinders circulation of electrolyte within the battery cells and limits lead recovery. Since lead suboxide deposits on the anodes as brittle amorphous layers, a moderate bending of the anodes is sufficient to promote the detachment of $Pb_2O$ fragmnets from the anode surfaces. By means of any grinding devices the produced $Pb_2O$ fragments are ground to powder; this powder has the same characteristics of that which is commonly referred to as "lead powder for battery electrodes manufacturing" and which is traditionally obtained by abrasion of lead ingots in furnaces. This lead suboxide is an important product of the process of my invention, and can be sold as such, or oxidized to the higher oxides, litharge and minium.

Continuous filtration of the electrolyte is not required, because the battery is in an upside-down position and will retain all the anode mud and slimes. This is why I believe that very pure lead cathodes are obtained by the process of my invention, since anode slimes containing alloying metals are not mechanically transported and entrapped in the cathodic deposit.

Thus, this invention takes advantage of the upside-down position of the battery and the fact that the battery holes are closed by their stoppers or otherwise. The battery is an upside-down position has its open bottom oriented upwardly so that lead complex formed during the dissolution of the battery electrodes, which has a specific gravity much higher than that of other species present in the electrolyte, tends first to fill up the battery container, and only then to diffuse outside the battery. This behavior causes the electrical connections between electrodes at the top of the battery, because of the inverted position, to always be immersed in an electrolyte with a higher lead content than electrolyte near the ends of the electrodes away from the top of the battery. The result is that the electrical connections are dissolved at a rate slower than that of the electrodes, thus providing electronic conduction during the whole process of forced electrochemical electrode dissolution, at the end of which they are completely dissolved themselves.

Further, the upside-down position assures electrical contact between groups of electrodes. In fact, if for any reason the electrical connections between electrodes are dissolved locally or corroded, at a rate faster than the electrodes, the electrodes themselves tend to fall down into the remaining integral part of the connection and reestablish electronic conduction.

In order to improve the structural characteristics of the flat cathodes, a variety of additives can be used, for example glue, tannic acid, phenol, naphthylamine and hydroquinone.

The finely divided lead deposit, obtained as described above, is treated as follows after being removed from the tanks:

1. In order to optimize conditions for oxidation, the deposit is pressed, centrifuged, or otherwise treated to remove electrolyte trapped in it and to increase its density. Oxidation also includes drying in stoves, ovens or the like.

2. Oxidation is done in a variety of ways: by thermal oxidation in open-air crucibles or to thermical oxidation in controlled atmosphere ovens; by oxidative grinding or any other mechanical operation; by chemical oxidation using additives or other substances which react with the deposit to form an oxide from the electrolytic deposit prepared by this invention.

Active material is also obtained by drying the deposit in vacuum autoclaves or similar systems, including revolving ones, and by simultaneous or subsequent autogenous grinding or with grinding devices.

Thermal oxidation is done in controlled atmosphere ovens, by optimizing the following variables: density of lead deposit, temperature, atmospheric composition, and length of treatment. The method described produces an homogeneous active material with the desired oxygen content.

For example, a 100 millimeter diameter ball, made with electrolytically-produced deposit as described and pressed to a density equal to 50% of the theorical density of lead in ingots, can be completely oxidized in the open air at 200° C in 10 minutes. The lead oxide so obtained has very low cohesion characteristics and is therefore easily reduced to powder. This powder is used to manufacture electrodes for electrical storage batteries.

The numerical values of the parameters and variables mentioned above are only given as examples of successful results; that is, the cited values do not limit the range of possible applications of this invention.

By "pole" in the specification and claims is meant one of the two battery terminals, usually indicated with the sign (+) positive and (−) negative.

By "cell" in the specification and claims is meant the basic unit of an electrochemical system; for example, in a 12 V lead-acid battery, a cell is one of the six separate units of which this type of battery is constituted.

By "battery electrical connections between electrodes" is meant internal or external metallic bridges for securing electronic conductivity between cells of a battery.

By "tanks" is meant vessels containing the electrolyte, batteries, cathodes and anodes.

By electrode is meant a positive or negative electrode contained within a battery cell.

By cathode is meant an electrode external to the batteries which is connected to a negative terminal of a power supply.

By anode is meant an electrode external to the batteries which is connected to a positive terminal of a power supply.

What is claimed is:

1. A method of extracting lead from the positive electrodes, negative electrodes, and electrical connections of spend lead-acid electric storage batteries, which comprises the steps of:

recharging the spend lead-acid batteries to reduce the $PbSO_4$ content thereof;

removing sulphuric acid from the recharged batteries;

opening the battery containers to gain access to all battery electrodes;

washing the electrodes and the inside and outside of the battery containers with water;

drying the washed batteries;

immersing the batteries in an electrolyte so that all battery electrodes are simultaneously in contact with the electrolyte, which is a sulfamate-based aqueous solution or an aqueous solution of acetates and sulfates; and circulating the electrolyte inside and outside the battery containers;

each immersed battery being an electrochemical system composed of a series of electronically connected positive and negative couples of electrodes all all immersed in the same electrolyte in which the negative electrodes naturally anodically dissolve to release lead ions into the electrolyte and electrons which go to the positive electrodes and reduce $Pb^{++++}$ to $Pb^{++}$, which dissolves in the electrolyte as lead complex.

2. A method of extracting lead from spent lead-acid electric storage batteries as described in claim 18, wherein the step of immersing the batteries in the electrolyte comprises positioning the opened batteries in the electrolyte with the battery container openings in a topside position, so that the enclosed lower portion of the battery containers will retain anodic muds and slimes containing grid allowing metals formed during the electrochemical action between immersed positive and negative electrodes.

3. A method of extracting lead from spent lead-acid electric storage batteries as described in claim 2, wherein the step of opening the battery containers is the step of removing bottoms of the battery containers, and which further comprises the step of closing top openings of the battery containers before immersing the batteries in the electrolyte.

4. A method of extracting lead from spent lead-acid electric storage batteries as described in claim 1, which further comprises the steps of:
immersing cathodes in the electrolyte, said cathodes being external to the batteries and being connected to the negative terminal of the power supply for said cathodes;
protecting negative poles of the batteries against contact with the electrolyte while the batteries are immersed; and
connecting the negative poles of the batteries to a positive terminal of the power supply for the cathodes at a predetermined time after the batteries are immersed in the electrolyte;
whereby the voltage applied between the negative poles of the batteries and the cathodes forces the dissolution of the electrodes and electrical connections of the batteries and pure lead is deposited on said cathodes.

5. A method of extracting lead from spent lead-acid electric storage batteries as described in claim 4, which further comprises the steps of:
immersing anodes in the electrolyte, said anodes being external to the batteries and being connected to a positive terminal of a power supply for said anodes; and
connecting a negative terminal of the power supply for the anodes to the negative terminal of the power supply for the cathodes;
whereby lead in the form of lead oxide is deposited on said anodes.

6. A method of extracting lead from spent lead-acid electric storage batteries as described in claim 4, which further comprises the steps of:
protecting positive poles of the batteries against contact with the electrolyte while the batteries are immersed;
immersing anodes in the electrolyte, said anodes being external to the batteries and being connected to a positive terminal of a power supply for said anodes; and
connecting the positive poles of the batteries to a negative terminal of the power supply for the anodes at said predetermined time after the batteries are immersed;
whereby lead in the form of lead oxide is deposited on said anodes.

7. A method of extracting lead from spent lead-acid electric storage batteries as described in claim 1, which further comprises the steps of:
protecting positive and negative poles of the batteries against contact with the electrolyte while the batteries are immersed;
connecting the batteries to a power supply for the batteries at a predetermined time after the batteries are immersed, with the negative poles of the batteries being connected to a positive terminal of the battery power supply, and the positive poles of the batteries being connected to a negative terminal of the battery power supply; and
immersing cathodes and anodes in the electrolyte external to the batteries, with the cathodes being connected to a negative terminal, and the anodes being connected to a positive terminal, of a separate power supply for the anodes and cathodes;
whereby the voltage applied to the batteries accelerates the dissolution of the electrodes and electrical connections of the batteries, and the voltage applied to the cathodes and anodes independently causes pure lead to be deposited on the cathodes, and lead in the form of lead oxide to be deposited on the anodes.

8. A method of extracting lead from spent lead-acid electric storage batteries as described in claim 7, wherein the step of immersing the batteries is performed by immersing the batteries in a first tank containing electrolyte, and the step of immersing the anodes and cathodes is performed in a separate second tank which is connected to the first tank to allow circulation of electrolyte therebetween, and the electrolyte is circulated between the tanks to maintain the lead ion concentration in the electrolyte approximately constant.

9. A method of extracting lead from spent lead-acid electric storage batteries as described in claim 1, wherein the electrolyte comprises a sulfamate-based aqueous solution.

10. A method of extracting lead from spent lead-acid electric storage batteries as described in claim 9, which further includes the step of maintaining the electrolyte at a temperature in the range of 15° C to 45° C.

11. A method of extracting lead from spent lead-acid electric storage batteries as described in claim 1, wherein the electrolyte comprises an aqueous solution of acetates and sulfates, which is maintained at an approximate temperature of 30° C, and the lead recovered is in the form of a very fine dendritic deposit of pure lead on the external cathodes.

12. A method of extracting lead from spent lead-acid electric storage batteries as described in claim 11, which further comprises the steps of:
removing the dendritic lead deposit from the cathodes;
pressing said deposit to remove trapped electrolyte and to increase density of the deposit; and
oxidizing the pressed lead deposit to obtain active material which can be used to manufacture electrodes for lead-acid storage batteries.

13. A method of extracting lead from spent lead-acid electric storage batteries as described in claim 1, which further comprises the steps of:
removing the lead oxide deposits from the external anodes by moderate flexing of the anodes; and
grinding the lead oxide removed to produce a lead powder for battery electrode manufacture.

14. In a method of extracting metals from electrodes of spent secondary electric storage batteries by electrochemically dissolving the electrodes in an electrolyte, the improvement which comprises the steps of:
  recharging the spent batteries;
  removing original electrolytic solution from the recharged batteries;
  opening the battery containers to gain access to all battery electrodes;
  immersing the batteries in an electrolyte so that all battery electrodes are simultaneously in contact with the electrolyte; and
  circulating the electrolyte inside and outside the batteries;
  whereby each immersed battery is an electrochemical system composed of a series of electronically connected positive and negative couples of electrodes all immersed in the same electrolyte, the natural discharge of which results in the dissolution of at least a portion of the metals into the electrolyte.

15. The improvement in a method of extracting metals from electrodes of spend secondary electric storage batteries, as described in claim 14, which further comprises the step of:
  completely discharging each immersed battery electrically connecting the poles of each immersed battery through a resistor which limits the rate of discharge.

16. The improvement in a method of extracting metals from electrodes of spend secondary electric storage batteries, as described in claim 14, which further comprises the step of:
  applying, across the poles of each immersed battery, a voltage of opposite polarity to the battery voltage, which forces dissolution of the metals into the electrolyte.

* * * * *